Dec. 16, 1947.  S. DOBA, JR  2,432,516
KEYED PULSE GENERATOR
Filed Dec. 30, 1943
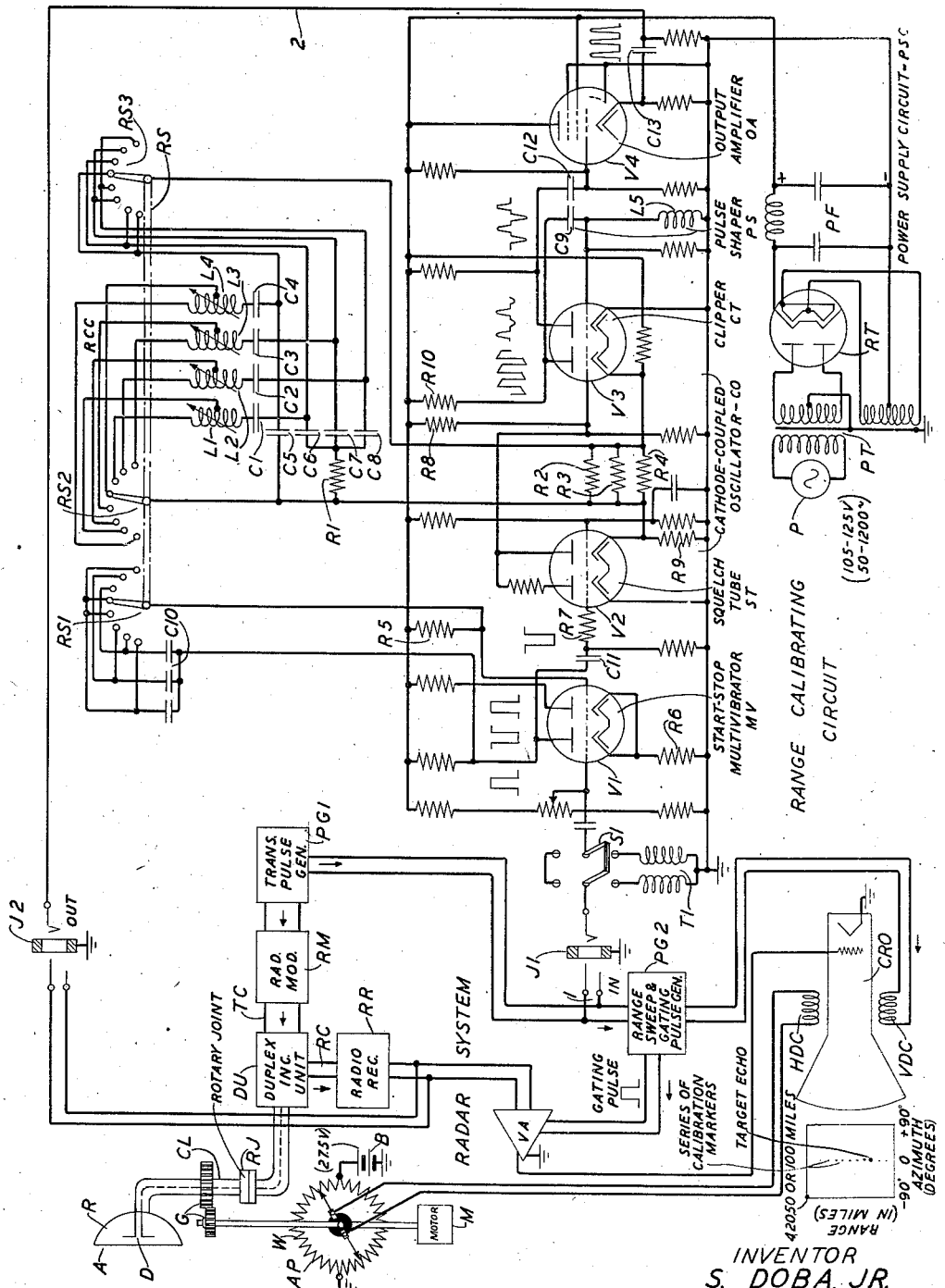
INVENTOR
S. DOBA, JR.
BY
Earl C. Laughlin
ATTORNEY Patented Dec. 16, 1947

2,432,516

UNITED STATES PATENT OFFICE 2,432,516

KEYED PULSE GENERATOR

Stephen Doba, Jr., Long Island City, N. Y., assignor to Bell Telephone Laboratories, Incorporated, New York, N. Y., a corporation of New York Application December 30, 1943, Serial No. 516,210

6 Claims. (Cl. 250—36)

The invention relates to wave generating circuits, and particularly to circuits for generating a series of wave pulses having a given time separation between them, for radar range calibration or other uses.

In pulse reflection type object locating systems, such as those employing radio waves commonly called radar systems, electrical means are provided at an observation point for generating and radiating at frequent intervals to a wave transmission medium, a train of very short pulses of high frequency energy, and for picking up from the medium, amplifying and detecting a portion of the return wave energy, echo pulses, reflected from objects (targets) in the medium, on which the radiated pulses impinge. The detected waves appear as a train of video pulses recurring at the rate of the radiated pulses but delayed in time in accordance with the distances to the objects causing the echoes. The video pulses are usually impressed on a control element of a cathode ray oscilloscope having its sweep synchronized with the period of the radiated pulses, so as to cause images of the echoes in the order of their receipt to be displayed along a time scale on the oscilloscope screen, the distance between each echo image and the zero point on the timing scale, which may be graduated in proportional distance units, providing a visual indication to the observer of the distance to (range of) the target causing that echo. Also, by the use of an auxiliary sweep control circuit synchronized with the azimuth of the rotating antenna of the radar system, the echo images may be displaced along another timing scale, graduated in proportional angle units, to provide a visual indication to the observer of the direction or bearing of the target with respect to the observation point, as well as its range.

An object of the invention is to check and facilitate the adjustment of the range calibration in such systems.

Another object is to generate a series of wave pulses having a definite time spacing between them.

A more specific object is to generate a series of wave pulses evenly spaced apart in time at intervals which are readily adjustable, and to inject the generated pulses into a radar system so as to produce on its indicator screen a series of correspondingly spaced timing marks for use as accurate range scales to enable adjustment of the scanning sweeps to conform with the range scales engraved on the screen.

Another object is to generate oscillatory wave energy in a novel manner.

These objects are attained in accordance with the invention by a novel pulse generating and range calibrating circuit. In one embodiment it comprises a "start-stop" multivibrator adapted to be "tripped off" by a positive or negative synchronizing pulse supplied from a radar system to be calibrated; a normally operative "squelch" oscillator control device which is rendered inoperative in response to the pulse output of the multivibrator; an adjustable frequency oscillator which is held disabled by the squelch control device when the latter is operative and is rendered operative when the squelch control device is rendered inoperative, to generate pulses of square wave form; and means for shaping, clipping and amplifying the resulting wave output of the oscillator so as to produce therefrom a series of identical positive pulses of sine wave form having a given time separation between them determined by the selected frequency of the oscillator. These positive pulses are injected into the receiving circuit of a radar or like system so as to produce a series of timing marks having corresponding time spacings between them, which may be indicated in proportional distance or range units on the indicator screen.

A feature of the invention is an oscillator comprising two electron discharge devices with coupling in the cathode circuits including an adjustable frequency-determining circuit.

The various objects and features of the invention will be better understood from the following detailed description when read in conjunction with the accompanying drawing the single figure of which shows schematically a range calibrating circuit embodying the invention, applied to a radar system.

Although the pulse generating and range calibrating circuits of the invention are adapted for use with any radar system or other pulse reflection type object locating system, it is illustrated in the drawing and described below as applied to one particular type of radar system with which it has been used, adapted for location of targets both in terms of azimuth and range. Only those parts of the system required for proper explanation of the invention are illustrated and described in any detail.

The radar system as shown in the drawing, which may be located at an observation point on a moving aircraft, vessel or at a land station, includes a pulse transmitting circuit TC and a pulse receiving circuit RC connected in a duplex arrangement with a common transmitting and receiving antenna A. The antenna A, which may be of the highly directive type shown consisting of a small polarized dipole D and a full parabolic reflector R, is connected by a coaxial link CL to the circuits TC and RC, and a rotary joint RJ in that link and the gearing G between the upper portion of the link CL and the shaft of the motor M enables the antenna A to be rotated in the horizontal plane at constant speed by that motor. If it is desired also to rotate the antenna A in the vertical plane to enable the radar system to be employed for locating targets, such as moving airplanes, above or below its horizontal position, another suitable rotary joint (not shown) may be provided also in the input coaxial line to enable the antenna A to be tilted over a desired angle above and below the horizontal axis at a desired constant speed by a driving motor (not shown).

In the system illustrated, extremely short but intense pulses of radio frequency energy for radiation in a beam from the antenna A, are supplied thereto at frequent intervals by the radio modulator RM periodically pulsed by the pulse generator PG1 in the transmitting circuit TC. The duplexing unit DU, provided to enable the use of the common antenna A for transmitting and receiving, may be in the form of an automatic transmit-receive switch of any of the known types, responsive to the application thereto of a portion of the necessarily high amplitude pulse energy outgoing to the antenna in transmitting intervals, to provide an effective protective short-circuit across the input to the receiving circuit, and allowing in pulse receiving intervals substantially all of the relatively low amplitude pulse energy received from the antenna to pass with little attenuation into the receiving circuit.

When the rotating radio beam from the antenna A strikes an object, usually referred to as a target, in its path, a portion of its energy will be reflected as echoes back toward the observation point. A portion of this energy will be intercepted by the antenna A and will be transformed therein to electrical pulse energy. The received electrical pulse energy or echo pulses will pass through the duplexing unit DU to the radio receiver RR in the receiving circuit RC, which may be of the double-detection, superheterodyne type, and will be amplified and detected in that receiver. The detected echo pulses, usually referred to as the video signal or signals, after further amplification in the video amplifier VA, will be applied to the control grid circuit of the cathode-ray oscilloscope CRO shown as being of the magnetically-controlled deflection type, and will produce intensity modulation of its cathode-ray beam.

Pulses synchronized with the period of the pulses outgoing from transmitting circuit TC to antenna A are also supplied from the transmitting pulse generator PG1 to the range sweep and unblanking pulse generator PG2 which may be, for example, of the type disclosed in the copending patent application of J. R. Hefele, Serial No. 498,099, filed August 12, 1943, or in the copending application of A. G. Fox, Serial No. 448,099, filed June 23, 1942. The generator PC2 is adapted to produce a saw-tooth voltage wave which is applied to the vertical deflection coil VDC of the oscilloscope CRO to provide the vertical range sweep of the cathode ray beam across the oscilloscope screen, and also to produce suitable pedestal pulses such that when they are applied, as indicated, to the circuit of the video amplifier VA, they will cause that amplifier to be enabled and thus the oscilloscope CRO to be unblanked during the desired sweep interval only.

The horizontal sweep of the oscilloscope CRO is synchronized with the azimuth of the rotating antenna A by means of the azimuth potentiometer AP which is affixed to the shaft of motor M so as to follow the antenna rotation and has a direct current voltage (27.5 volts) supplied to it from the battery B connected across diametrically opposite points of its full circle winding W. A voltage varying between positive and negative values (from +27.5 to −27.5 volts) as the angle of the antenna A with respect to its horizontal axis varies, is taken off from this winding by two diametrically opposite sliders insulated from each other, and is applied to the horizontal deflecting coil HDC of the oscilloscope CRO, causing a corresponding horizontal (azimuth) sweep of the cathode-ray beam across the oscilloscope screen.

The combined action of the intensity modulation of the cathode-ray beam by the applied echo pulses from targets within the desired distance range, and the horizontal and vertical sweeps of the cathode-ray beam will cause an image of each echo pulse, which may be in the form of a luminous dot, to be displayed on the oscilloscope screen. By noting the location of each luminous dot with reference to the engraved vertical timing scale, graduated in proportional distance or range units (miles), and to the engraved horizontal timing scale, graduated in proportional azimuth units (degrees), the observer may determine the distance or range of the target causing the echo, from the observation point, and the direction of the received radio beam, corresponding to the angle between the rotating antenna and its horizontal axis at the time the echo is received, which is the direction of the target from the observation point. Thus, the targets may be accurately located. The type of picture which the operator will see on the oscilloscope screen is shown to the left of the oscilloscope CRO on the drawing. By proper selection of the constants of the timing elements in the generator PG2 which generates the unblanking pulse, the time during which the video amplifier VA is rendered operative under control of the unblanking pulse, and thus the distance range over which the radar system works, may be adjusted as desired. In one particular radar system of this type with which the range calibrating circuit of the invention was used, means were provided in the unblanking pulse generator for adjusting its time constant so as to provide any one of four distance ranges, i. e., 4, 20, 50 and 100 miles; and four corresponding range scale were engraved on the oscilloscope screen.

The pulse generating circuit of the invention which may be used to check and facilitate the adjustment of the range calibration of the indicator in the radar system illustrated and described above, as shown in the drawing comprises as main elements: the multivibrator MV; the "squelch" oscillator control device ST; the oscillator CO and associated range control RCC; the differentiating circuit or pulse shaper PS; the "clipper" electron discharge device CT; the output amplifier OA; and the power supply circuit PSC.

The multivibrator MV is of the well-known "start-stop" type being composed of two cathode-coupled triode amplifier sections, which as shown may be contained in a single dual-triode tube V1. The squelch control device ST comprises the first triode section of a similar dual-triode tube V2. The oscillator CO comprises the second triode section of tube V2 and the first triode section of a third dual-triode tube V3, with coupling in their cathode circuits, and the associated range control RCC is an adjustable series resonant frequency-determining circuit in the connection between the cathodes, consisting of the four tuned inductors L1 to L4, the eight capacitors C1 to C8 and the four terminating resistors R1 to R4 which under control of the sections RS2 and RS3 of the range switch RS may be associated in various combinations to change the resonant frequency of the oscillator. The "clipper" device CT comprises the second triode section of the tube V3. The pulse shaper PS is a network consisting of a capacitor C9 and a choke coil L5 in series, connected between the two triode sections of V3. The output amplifier OA comprises a single pentode amplifying tube V4. The power supply circuit PSC, used for furnishing the required alternating and direct current voltages for cathode heating, plate supply and grid biasing of the tubes V1 to V4, comprises the power transformer PT, the rectifier RT and power supply filter PF, adapted to operate from a 105-125 volt alternating source P whose frequency may have any value between 50 and 1200 cycles.

The control grid-cathode circuit of the first (left-hand) triode section of the multivibrator tube V1 is adapted for connection through the "in" jack and plug arrangement J1 and the input conductors 1, which may be a short length of coaxial cable, to the transmitting pulse generator PG1 of the radar system, so as to receive triggering pulses synchronized with the outgoing pulses transmitted from antenna A; and the plate-cathode circuit of the output amplifier OA is adapted for connection across the input of the video amplifier VA in the radar receiving circuit RC by the "out" jack and plug arrangement J2 and the conductors 2 which may comprise a short length of coaxial cable.

When the range calibrating circuit is synchronized from the usual radar system, it must trigger from a positive sense pulse, and it is desirable that its sensitivity be comparatively low to avoid false triggering from spurious signals associated with the trigger pulse. In that case, the reversing switch S1 should be thrown to its upper set of contacts, so that the "in" jack J1 is connected directly to the input grid of the cathode-coupled multivibrator tube V1 to provide a high impedance input circuit suitable for the bridging connection and responsive to positive pulses. If, on the other hand, the associated radar system supplies a synchronizing pulse of negative sense, a comparatively low impedance input circuit sensitive to negative pulses may be provided by throwing the switch S1 to the lower set of contacts, which connects in the step-up transformer T1 so that the synchronizing pulse is stepped up in magnitude and is reversed in sense before it is impressed on the multivibrator. Approximately one volt of positive or negative pulse is required for triggering.

The other essential elements of the circuits of the invention will be brought out in the following description of operation.

Let it be assumed that the range calibrating circuit is plugged into the radar system by the jack and plug arrangements J1 and J2; that the radar system is turned on so as to supply short pulses of radio frequency to the antenna A for radiation therefrom, and synchronizing pulses from the transmitting pulse generator PG1 through input circuit 1 and the "in" jack and plug arrangement J1 to the control grid circuit of the first triode section of multivibrator tube V1; and that the reversing switch S1 is thrown to its upper or lower set of contacts depending on whether the applied synchronizing pulses are positive or negative. In either case, a positive synchronizing pulse of square wave form is applied to the grid of the first triode section of multivibrator V1, as indicated by the curve shown above and to the left of that grid.

*General description of operation*

Each time a synchronizing pulse is received from the radar system, the cathode-coupled multivibrator MV produces a negative sense square pulse, as shown by the curve above the left-hand plate of tube V1, whose duration by proper selection of the multivibrator circuit constants is made longer than the sweep which is to be calibrated. This negative sense square pulse is applied to the grid of the normally operative squelch control device ST, the first triode section of V2, driving it to cut-off. This enables the normally disabled cathode-coupled oscillator CO comprising the second triode section of V2 and the first triode section of V3, to oscillate for the duration of the pulse. The oscillator frequency, determined by the adjustment of the adjustable-frequency resonant circuit of the associated range control RCC in the connection between the cathodes of the two oscillator triodes, is made such that the spacing between successive cycles of the generated wave corresponds to the desired mile spacing between the calibrating "pips" to be produced. The generated oscillations, which are in the form of square waves as indicated by the curve above the left-hand plate of tube V3, are impressed on the differentiating circuit or pulse shaping network PS employing the capacitor C9 and choke coil L5, having a self-resonant frequency of approximately 1000 kilocycles. The output of the pulse shaper PS, as shown by the curve above capacitor C9, consists of half cycles of sine waves whose base length corresponds to the half cycle length (0.5 microsecond) of the differentiator choke coils resonant frequency, and whose spacing corresponds to the cycle length of the cathode-coupled oscillator CO. This differentiated signal is applied to the control grid of the "clipper" amplifier tube CT, the second triode section of tube V3, which operates at zero bias. The positive sense differentiated pips are clipped by grid conduction of the right-hand grid of V3 while the negative sense pips are amplified to approximately 60 volts amplitude and appear with positive sense at the right-hand plate of tube V3, as indicated by the curve right above that plate. The resulting pulse wave is impressed on the control grid of the output amplifier tube V4, which is arranged as a cathode follower biased to cut-off. The positive pips impressed on its control grid bias the tube V4 below cut-off, so that the tube completes the clipping process started by the clipper tube (output triode of tube V3). The result is a wave consisting of a train of amplified identical positive pulses of sine wave form, as indicated by the curve to the right of tube V4, having a base length determined by the selected resonant frequency of the pulse shaper PS, and a definite time spacing between them corresponding to the desired mile spacing, which is determined by the selected frequency of the oscillator CO.

The train of produced positive pulses is applied through the "out" jack J2 and output conductors 2 to the input of the video amplifier VA of the radar system, and in amplified form is applied from the output of amplifier VA to the intensity grid of the cathode-ray oscilloscope CRO, resulting in the appearance on the oscilloscope screen of a series of luminous dots evenly spaced in time at intervals corresponding to the "miles" setting of the range control switch RS in the range control RCC associated with oscillator CO, the first dot occurring at the time the trigger pulse from the radar system is applied to the range calibrating circuit. The series of calibrating dots as they appear on the oscilloscope screen to the observer, is shown on the diagram to the left of the oscilloscope CRO in the drawing. The comparison of the location of these dots or time markers with the indicator range scales will indicate whether or not the radar range calibration requires adjustment. (In the case of the ¼ mile pips, the dots will be somewhat broad and about 1/25 mile in width, on the scale. As the pip spacings and indicator sweep length are increased, the dots will decrease in size, until 10-mile pips on a 100-mile sweep will appear as tiny dots whose size is determined by the definition of the indicator.)

A more detailed description of the operation of the pulse generating and range calibrating circuit of the invention follows:

In the quiescent condition, before the arrival of the synchronizing pulse, the first (left-hand) triode section of multivibrator tube V1 is cut off (non-conducting), and the second (right-hand) triode section is at zero bias since its grid is returned to the positive terminal of the plate voltage supply, so it is highly conducting. When a positive synchronizing pulse is applied to the control grid of the first triode section of V1, its plate current starts to flow, and the applied pulse is amplified and appears in the negative sense on the left-hand plate of the tube, as indicated by the curve just above that plate. This negative pulse is applied to the grid of the second triode stage of V1 through the interstage capacitor C10 and resistor R5, and will be of sufficient amplitude to drive that triode section to cut-off. The flow of plate current in the second triode section of V1 then ceases, so that no voltage drop appears across the common cathode resistor R6 for the two triode sections. Since R6 provides the cathode bias voltage for the first triode section, this bias voltage tends to decrease causing that triode section to operate at zero bias. After the synchronizing pulse is removed, the first triode section of V1 will remain at zero bias since its grid is tied to the positive terminal of the plate voltage supply and will draw just sufficient current to maintain this bias. The negative signal, which the capacitor C10 impressed on the grid of the second triode section of V1, decays as that capacitor discharges through resistor R5, causing the grid potential of the second triode section of V1 to rise. When that grid potential rises to that point below the cathode potential at which the second triode section draws plate current, its plate current makes a contribution to the voltage drop across cathode resistor R6. This raises the cathode voltage of the first triode section of V1 relative to its grid, tending to cut off that triode section. When the first triode section has been cut off, the circuit is in its original quiescent condition, and is ready for the application of another triggering pulse. The multivibrator V1, therefore, has produced a negative sense pulse at its left-hand plate and a positive sense pulse at its right-hand plate, as indicated by the curves above these plates, the duration of the produced pulses being determined by the time constant of the capacitor C10 and the resistor R5.

Since the calibrating circuit of the invention as shown in the drawing was required to produce trains of pulses lasting as long as 1,100 microseconds to calibrate a 100-mile sweep, and yet to produce pulse trains as often as every 500 microseconds to calibrate a sweep associated with a 2,000-cycle radar pulsing rate, the duration of the multivibrator pulse must be varied according to the length of the radar sweep to be calibrated. Accordingly, the capacitor C10 was made up of three condensers adapted to be connected in circuit for different settings of the associated "miles" switch, first section RS1 of range switch RS, simultaneously adjusted with its sections RS2 and RS3, as indicated, of such selected values that the multivibrator will produce a 380-microsecond square wave for use with ¼-mile and 1-mile calibrating pips, a 800-microsecond square wave for use with 5-mile calibrating pips and a 1,200 microsecond square wave for use with 10-mile calibrating pips.

The left-hand plate of multivibrator tube V1 is connected through the capacitor C11 and resistor R7 in series to the grid of the squelch or oscillator control device ST, the first (left-hand) triode section of tube V2, which is at zero bias when the multivibrator is in its quiescent state, but which is driven to cut-off in response to the negative pulse applied to its grid when the multivibrator MV is producing a pulse in response to a synchronizing signal. In the quiescent condition, the plate current of the squelch tube ST flowing through the resistor R8 causes so much voltage drop that the plate voltage of the second triode section of tube V2, constituting one triode section of the cathode coupled oscillator CO, is too low to permit oscillation. The application of the negative signal pulse from the multivibrator MV to the grid of the squelch tube ST, causes the plate current of the latter to be cut off, and the plate voltage of the first oscillator triode of CO, second triode section of V2, to rise abruptly. Since the grid of the second oscillator triode, first (left-hand) triode section of tube V3, is connected directly to the plate of the squelch tube ST, its voltage rises abruptly, tending to increase the plate current of the second oscillator triode. This increase in plate current causes more voltage drop in the cathode resistor R9, which in turn causes the cathode voltage of the first oscillator triode to rise relative to its grid voltage thus decreasing its plate current. As the plate current of the first oscillator triode decreases, its plate voltage rises, causing the grid voltage of the second oscillator triode to rise. Thus, an incremental increase of the grid voltage of the second oscillator triode has caused a further and larger increase in this same voltage, denoting positive feedback, causing oscillation of the oscillator CO at a frequency determined by the associated circuit.

The inductors L1 to L4, capacitors C1 to C8 and resistors R1 to R4 in the range control RCC are so associated with the contacts of the sections RS2 and RS3 of the range switch RS, that by the simultaneous adjustment of the variable arms of the two range switch sections, various values of inductance and capacitance are selected for the series resonant circuit connected between the cathodes of the two oscillator triodes, so as to make the cycle length of the oscillations generated by the cathode-coupled oscillator CO equivalent to radar ranges of ¼, 1, 5 or 10 miles (either nautical or statute) as desired, the particular range selected being indicated by the markings on the range switch dials. The simultaneous adjustment of the variable arm of section RS1 of the range switch RS to vary the value of the coupling capacitance provided by capacitor C10 in the multivibrator MV, as pointed out above, selects the proper multivibrator pulse length for the range switch setting.

For any setting of the range switch RS, the arrangement of elements in the range control RCC provides in series with the plate voltage supply for the second oscillator triode, a series resonant circuit composed of capacitance and inductance in series shunted by resistance, the latter being large in relation to the series resonant impedance of the series capacitance and inductance, and another capacitance in parallel with that combination. When the voltage on the grid of the second oscillator triode (first triode section of the tube V3) rises, the plate current of that triode must rise in accordance with the transient response of the series inductance and capacitance in the resonant circuit. Therefore, the plate current change produces a sine wave whose frequency is determined by the series inductance and capacitance in the series resonant circuit. If a suitable value of capacitance is connected in parallel with the series resonant circuit, the impedance of the combination will be low to frequencies which are high with respect to the series resonant frequency, and yet the series resonant frequency will be affected only slightly by the parallel capacitance. This permits a steep rise of current through the resonant combination, yet retains the same resonant frequency. This, in combination with the fact that the oscillator triodes are operated in a highly overloaded condition, causes the oscillations generated by the oscillator CO to be essentially square waves whose frequency is determined by the values of the series inductance and capacitance in the series resonant circuit.

The square wave output of the oscillator CO, like that shown by the curve just above the left-hand plate of tube V3, appears across the resistor R10 and is impressed on the differentiating circuit or pulse shaping network PS including the capacitor (.006 microfarad) C9 and choke coil L5 (1 millihenry) having a self-resonant frequency of approximately 1000 kilocycles. The abrupt changes in voltage in the applied square wave induce in the coil L5 half cycles of sine waves at the self-resonant frequency of the coil. Thus, the output of the differentiator pulse shaper PS has the wave form shown directly above it in the drawing. This differentiated wave is impressed on the grid of the "clipper" voltage amplifier tube CT, the second triode section of tube V3, having zero bias. The positive sense differentiated pips of the applied wave are clipped by grid conduction of this amplifier, since its positive grid impedance is low relative to that of the self-resonant circuit. The negative sense differentiated pips of the applied wave are amplified and appear at the right-hand plate of V3 as positive pips of approximately 60 volts magnitude, as indicated by the curve directly above that plate. These pips are then impressed through capacitor C12 on the control grid of the output amplifier pentode V4 which is a cathode follower. A small part of the top of each pip is rectified by grid conduction in V4 and serves to bias the tube beyond cut-off, thus eliminating the small negative projections on the voltage amplifier output wave received from tube V3. The time constant of the control grid circuit of tube V4 is purposely made small to eliminate distortion of the pip train envelope. The cathode of tube V4 is coupled to the output circuit of the range calibrating circuit, which may have any impedance between 72 and 1000 ohms, through a large capacitor C13 (2 microfarads), which serves to prevent distortion of the pip train envelope. The amplified train of positive pips of sine wave form with a time spacing between them corresponding to the desired mile spacing determined by the selected frequency of oscillator CO, as shown by the curve above the capacitor C13, appears at the "out" jack J2 of the calibrating circuit, and may be impressed on the radar receiving circuit as described above to produce a series of luminous dots with corresponding mile spacings on the indicator screen.

A pulse generating and range calibrating circuit substantially as shown in the drawing has been built in a self-contained compact portable unit, so that it can easily be transported to different locations for use in checking different radar systems. The complete unit including a power cable 20 feet long and two coaxial connecting cables each 6 feet long and associated connectors, and the steel carrying case, weighed about 28 pounds and had the dimensions 13" x 12" x 9¼".

Various modifications of the circuits illustrated and described above which are within the spirit and scope of the invention will occur to persons skilled in the art.

What is claimed is:

1. In combination, a multivibrator of the start-stop type for generating a square wave pulse of given duration, adapted to be tripped off periodically, a normally operative electron discharge control device adapted to be rendered inoperative by each multivibrator pulse for the period of its duration, an oscillator which is held disabled by said control device when the latter is operative and is set into oscillation when said control device is rendered inoperative by an applied pulse, to generate oscillations of a given frequency and of square wave form during the period of pulse application, and means to produce from the oscillations generated during each operative period of said oscillator a train of identical sine wave pulses having a definite time separation between them corresponding to the cycle length of the oscillations.

2. The combination of claim 1, in which said oscillator comprises two electron discharge amplifying devices, each having a cathode, coupled in tandem through their cathodes, and a resonant circuit providing strong positive feedback between said cathodes at the resonant frequency and little feedback at other frequencies.

3. An alternating wave generator comprising two tandem-connected electron discharge devices each having a cathode, an anode and a control grid, and circuits therefor, an oscillatory coupling between said devices including a direct electrical feedback connection between the cathodes thereof, adjustable means in said connection for determining the frequency of the generated oscillations and an output circuit for taking off said generated oscillations.

4. An oscillator comprising two tandem-connected electron discharge amplifying devices, each including a cathode, an anode and a control electrode, and circuits therefor, an oscillating coupling between said devices including a series resonant circuit including inductance and capacitance connected between their cathodes producing strong positive feedback at its resonant frequency and little feedback at other frequencies, so that the entire circuit is constrained to oscillate at the resonant frequency of the feed-back path.

5. In combination, a source of synchronizing wave pulses having a given frequency of repetition, a multivibrator of the start-stop type, adapted to be tripped-off by each of said wave pulses, so as to generate a square wave pulse of given duration, a normally operative electron discharge control device adapted to be rendered inoperative by each multivibrator pulse for the duration thereof, an adjustable frequency oscillator held disabled by said control device and adapted to be immediately rendered operative when said control device is rendered inoperative by a multivibrator pulse, to generate oscillations of a selected frequency and of square wave form during its duration, means for shaping said oscillations to produce a train of half cycle pips of sine waves having a time spacing between them determined by the cycle length of said oscillator, and means for clipping the negative sense pips and amplifying the positive sense pips.

6. In combination, a multivibrator of the start-stop type, adapted for generating a square wave pulse, means for triggering off said multivibrator at definite time intervals, a normally operative control device adapted to be rendered inoperative by the pulse generated by said multivibrator, for the time duration thereof, an oscillator which is disabled by said control device when the latter is operative and is immediately rendered operative when said control device is rendered inoperative, to generate during each inoperative interval of the control device oscillations of a given frequency and of square wave form, means for differentiating the wave output of said oscillator to produce a wave train comprising half cycle pips of sine waves of a given base length and having a time spacing between them corresponding to the cycle length of the oscillations generated by said oscillator, means to clip the negative pips in each wave train and to amplify the positive pips to a desired value so that there is produced in response to each multivibrator pulse a train of identical time-separated positive sine wave pips and means to adjust the frequency of said oscillator so as to provide the desired time spacing between said positive pips in each produced wave train.

STEPHEN DOBA, Jr.

REFERENCES CITED

The following references are of record in the file of this patent:

UNITED STATES PATENTS

| Number | Name | Date |
|---|---|---|
| 2,189,549 | Hershberger | Feb. 6, 1940 |
| 2,227,598 | Lyman et al. | Jan. 7, 1941 |
| 2,230,926 | Bingley | Feb. 4, 1941 |
| 2,242,934 | Wheeler | May 20, 1941 |
| 1,989,510 | Fitzgerald | Jan. 29, 1935 |
| 2,060,988 | Hansell | Nov. 17, 1936 |
| 2,208,422 | Hugon | July 16, 1940 |
| 2,181,568 | Kotowski | Nov. 28, 1939 |
| 2,368,449 | Cook | Jan. 30, 1945 |
| 2,300,996 | Vanderlyn | Nov. 3, 1942 |
| 1,994,760 | Eitel | Mar. 19, 1935 |

FOREIGN PATENTS

| Number | Country | Date |
|---|---|---|
| 541,029 | Great Britain | Nov. 10, 1941 |